Patented Nov. 29, 1938

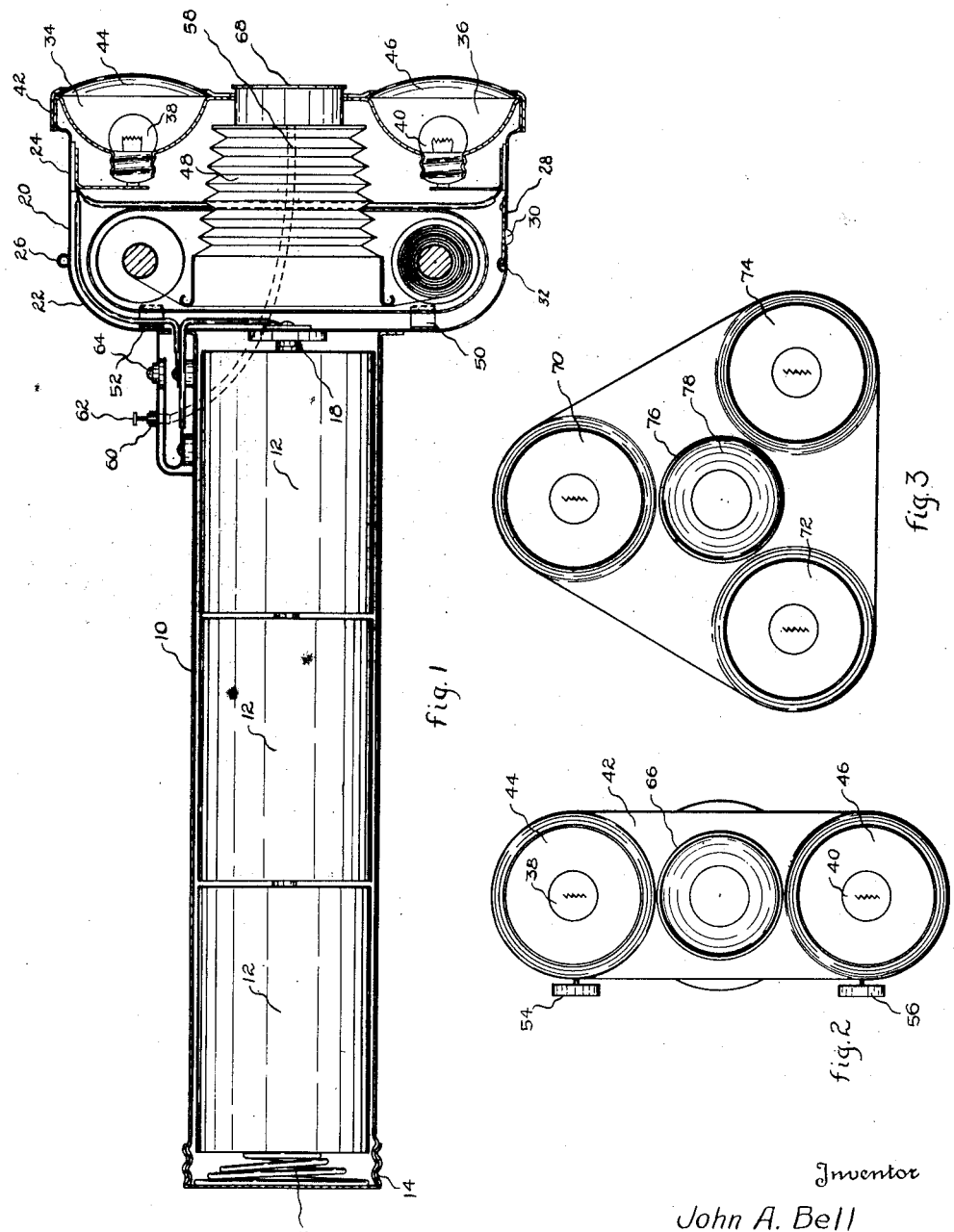

2,138,723

UNITED STATES PATENT OFFICE 2,138,723

COMBINATION PORTABLE POCKET LIGHT AND CAMERA UNIT

John Arthur Bell, Jackson, Mich.

Application May 25, 1936, Serial No. 81,677

2 Claims. (Cl. 240—6.4)

The present invention relates to improvements in portable combination pocket light and camera units.

An object of the invention is to provide an inexpensive efficient unit for taking photographs at night which is particularly adaptable for use by police officers for crime detection, for nature study and the like.

Another object is to provide a combination pocket light and camera unit which is compact and designed to receive a miniature camera of well known construction available at the present time upon the market.

A further object resides in a novel portable holder unit for incandescent lights and camera in which the camera is held centrally of two or more light reflectors so as to uniformly illuminate objects at the point of focus of the camera.

These and other objects and advantages residing in the specific details of construction and combination and arrangement of parts will become apparent from the following description when considered in connection with the accompanying drawing wherein:

Fig. 1 is a longitudinal cross-sectional view through my improved pocket and camera unit, Fig. 2 is a front elevational view of the unit shown in Fig. 1 as viewed from the left, and Fig. 3 is a view similar to Fig. 1 of a modified construction showing the lens of the camera centrally positioned with reference to three reflectors.

The present invention contemplates a compact pocket light and camera unit which may be conveniently carried by a police officer or person interested in photographing objects at night. Preferably, the unit is designed to removably receive a miniature camera of well known construction which when positioned the lens thereof is centrally located with reference to two or more light reflectors forming concentrated light beams respectively, so arranged that objects in the focus of the camera will be uniformly illuminated; the focus of the light reflectors being such as to act as a finder for the camera. To obtain the maximum amount of utility my unit is preferably constructed so as to serve the purpose of pocket flash lights of conventional construction, as a camera holder, or the camera may be readily removed from the holder and used separately.

Referring to Fig. 1 there is shown a form of the invention consisting of a tubular body 10 within which is housed a plurality of batteries 12 which are inserted by removing the cap 14 which is shown equipped with a resilient member 16 for urging the terminals of the batteries 12 into engagement with each other and into engagement with a contact 18. At one end of the body 10 is an enlarged head 20 which is preferably made of two sheet metal stamped parts 22 and 24, the part 22 being dish-shaped being attached to one end of the body 10. The part 24 is shown hinged to the part 22 at 26; the parts 22 and 24 being held in the position shown in Fig. 1 by some suitable latch means such as a spring finger 28 carried by the part 24 and having a hook 30 adapted to be snapped over the flange 32 on the part 22. Suitably supported in the hinged part 24 are reflectors 34 and 36 having light bulbs 38 and 40 threaded into and held in position in a well known manner. A removable cap 42 positions lenses 44 and 46 relative to their respective reflectors.

With the part 24 swung outwardly about its hinge 26 a small camera 48 of well known construction is insertable into the part 22 and held in position by spring clips 50 and 52 embracing oposite sides of the camera structure. The camera 48 is of the type using a rolled film with the usual turn keys 54 and 56 extending out through suitable openings (not shown) in the parts 22 and 24 in position to be readily manipulated. The shutter operating cable 58 extends through an opening in the part 22 and is received in a spring clip 60 to position the usual thumb operated plunger 62 adjacent the push button switch 64 which is manipulated to complete the circuit between the batteries and the light bulbs in a well known manner. The front portion of the part 24 and cap 42 are apertured to provide an opening 66 slightly larger than the forward end 68 of the camera in which the lens is located to permit the same to project therethrough. The opening 66 is preferably midway between the reflectors 34 and 36 and in turn the reflectors 34 and 36 are so constructed so that the light beams emitted therefrom overlap and provide a maximum illumination within the focusing range of the camera. In addition, the construction of the reflectors 34 and 36 is such that the limit of the beams of light emitted therefrom is sufficiently confined as to constitute a finder for the camera.

I have found that satisfactory results can not be obtained by the use of a single reflector for the reason that it is not commercially practical to eliminate the dark spot which is usually found at the center of a single light beam. However, by using two or more reflectors the camera may be focused at the point of intersection and overlapping of the beams which gives a uniform illumination to the object being photographed. While I have found that two light reflectors give satisfactory results and are preferred for the sake of compactness, more than two reflectors may be used as shown in Fig. 3 wherein three reflectors 70, 72 and 74 are shown equally positioned about the opening 76 in the removable cover of the unit through which the forward end 78 of the camera projects.

While the camera is preferably of removable construction and of a design enabling the same to be used independently of my combination pocket light and camera unit it may be built in and become a unitary part of the holder structure for the batteries and reflectors.

It will be fully appreciated that the present invention is exceedingly adaptable for use by police officers who usually carry, as part of their equipment, a pocket flash light and officers so equipped will be able to bring a fleeing person or intruder into the intersecting light beams and to take a photograph with the unit held in one hand with the other hand free for manipulation of the firearm or night club. For use in taking night photographs by persons interested in nature study the same characteristics of compactness and ability to be operated by one hand lends the present invention for such purposes.

When the lighting provided by the equipment hereinabove described does not make possible pictures of sufficient detail for the purpose desired, greater detail may be obtained by using the present apparatus in combination with the usual flashlight apparatus synchronized to provide a flash at the instant of the opening of the camera shutter. In such case, the function of the reflectors is solely for providing a concentrated beam to assist in directing the camera in the proper direction.

It is fully anticipated that changes in construction and form over that disclosed herein will readily occur to those skilled in the art and for that reason I do not wish to restrict the invention to the specific construction shown but to include all changes in construction and shape coming within the spirit of my invention and falling within the scope of the appended claims.

Having thus described my invention what I desire to protect by Letters Patent and claim is:

1. A portable combination light and camera unit comprising an elongated body for the storage of batteries and constituting a handle to be received in the palm of the hand, an enlarged head at one end of said body comprising fixed and hinged parts, a removable camera unit adapted to be removably supported and housed in said fixed part with the lens thereof axially aligned with said body, a plurality of reflectors with bulbs therein for forming concentrated light beams respectively, supported from said hinged part, said reflectors with said hinged part in closed position being located upon opposite sides of said lens with the reflecting light beams thereof overlapping within the focusing range and being directed along the axis of said camera.

2. A portable combination light and camera unit, comprising an elongated body for the storage of batteries and constituting a handle to be received in the hand, an enlarged head at one end of said camera comprising fixed and separable parts, a removable camera unit housed in said fixed part with the lens thereof axially aligned with said body, a plurality of reflectors with bulbs therein for forming concentrated light beams respectively supported from said separable part, said reflectors with said separable part in closed position being located on opposite sides of said lens with the reflecting light beams thereof overlapping within the focusing range and being directed along the axis of said camera.

JOHN ARTHUR BELL.